6377X
Hetzel & Beurer,
Thrashing Mach.
Patented Feb. 14, 1831.
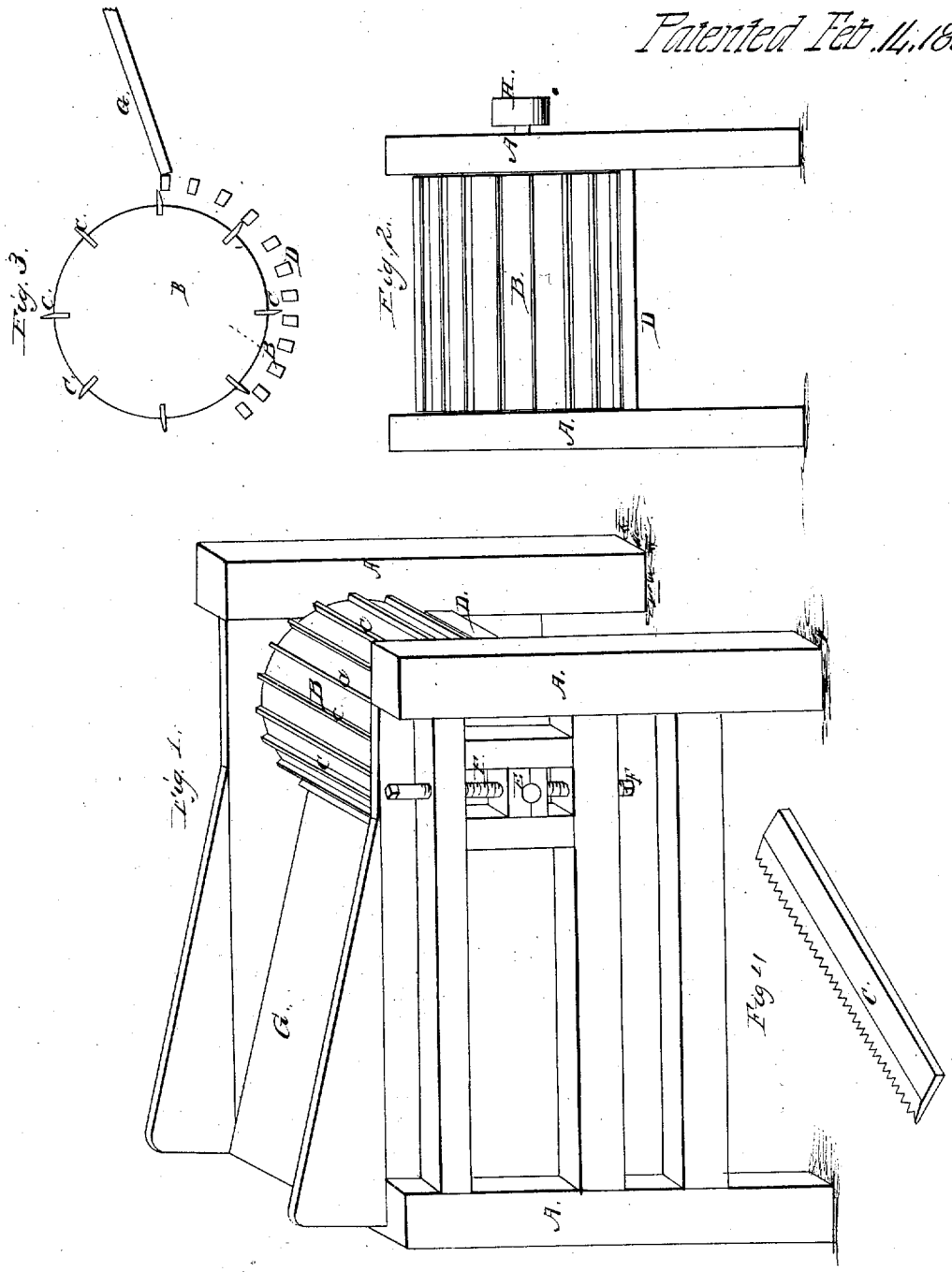

6377X Feb. 14. 1831 24

Jacob Hetzel & Jesse Bevier
Letters Patent

The schedule referred to in these Letters Patent, and making
part of the same, containing a description in the words of the
said Jacob Hetzel & Jesse Bevier themselves of their improve-
ment in the Machine for Thrashing grain & Shelling corn

---

To all ^whom these presents shall come. Be it known that
we Jacob Hetzel & Jesse Bevier, of Ithaca, in the County of Tompkins,
and State of New York, have invented a new and useful improvement
in the machine for the thrashing of wheat, rye, and all other
kinds of grain and seed, and for ^the shelling of corn; and that
the following is a full and exact description of the construction
and operation of the said machine as invented or improved by us.
This Machine is constructed by a frame of wood of the size to suit
the power to be applied, but a size suitable to be drove by one horse
is two feet wide and about three feet long, and about twenty inches
or two feet high with a cylinder of iron or wood long enough to
fill the width of the frame with bars of iron about one and a
half inch wide and about three eighths of an inch thick; these
bars are to let edgeways into the cylinder about half the width of
the bar and the outer edge chamfered down on one side so as to
bring it to the thickness of one eighth of an inch thick, with teeth on
the edge about like the teeth of a coarse hand-saw; these bars to be
placed on the cylinder about three inches apart round the sur-
face of the cylinder, the size of which should be proportioned
to the velocity to be given: a twelve inch cylinder should be so
geared as to give about twelve hundred revolutions in a min-
ute: a concave is then formed by square bars of iron about five
eighths of an inch diameter or flat bars set up edgeways: the bars
of the concave are either with or without teeth similar to those
in the bars of the cylinder; these bars are stationary and about
twelve in number, and about one fourth of an inch from Drawing

248.

6377X each other, beginning about as high as the center of the cylinder and passing under the bottom of it about one third way round and near enough to suit the grain to be thrashed; the cylinder being governed by screws to raise it from or let it near the concave, and is suspended by friction boxes which are held down by screws so that it cannot raise nor fall except by turning the screws; an inclined box is placed on the back part of the frame, the forward part of which comes close to the first bar of the concave to conduct the grain or corn in under the cylinder: the shaft of the cylinder extends through far enough to admit of a small whirl made fast to apply the band from a drum or wheel to put the machine in motion: the grain or corn passes between the surface of the cylinder and the concave bars.

What is claimed by this improvement is, the teeth in the bars upon the cylinder acting upon the grain over the concave of bars with or without teeth; and also the cylinder being fixed and stationary so that it cannot raise or fall except at pleasure.

Jacob Hetzel
Jesse Bevier

Witnesses
Wm Linn
Saml Low 612 words

Exd. W.C.